US012669015B2

(12) United States Patent
Walkerden et al.

(10) Patent No.: US 12,669,015 B2
(45) Date of Patent: Jun. 30, 2026

(54) LADDER

(71) Applicant: Ladder Solutions USA Inc., Leumeah (AU)

(72) Inventors: Paul Walkerden, Leumeah (AU); Kenneth P. Walkerden, Leumeah (AU)

(73) Assignee: Ladder Solutions USA Inc., Leumeah (AU)

( * ) Notice: Subject to any disclaimer, the term of this patent is extended or adjusted under 35 U.S.C. 154(b) by 323 days.

(21) Appl. No.: 18/430,719

(22) Filed: Feb. 2, 2024

(65) Prior Publication Data

US 2025/0250859 A1 Aug. 7, 2025

(51) Int. Cl.

*E06C 1/12* (2006.01)
*E06C 1/06* (2006.01)
*E06C 7/08* (2006.01)

(52) U.S. Cl.

CPC .................. *E06C 1/12* (2013.01); *E06C 1/06* (2013.01); *E06C 7/084* (2013.01)

(58) Field of Classification Search

CPC ... E06C 1/12; E06C 1/16; E06C 7/084; E06C 7/08; E06C 7/082; E06C 7/085

See application file for complete search history.

(56) References Cited

U.S. PATENT DOCUMENTS 4,815,564 A * 3/1989 Yoo ............................ E06C 1/32 182/163
4,974,701 A * 12/1990 Parise ........................ E06C 1/32 182/194
5,062,499 A * 11/1991 Tu .............................. E06C 1/22 182/195
9,027,711 B2 * 5/2015 Lonergan .................. E06C 1/10 182/163
2005/0178615 A1 * 8/2005 Woller .................... E06C 7/081 182/116
2016/0265277 A1 * 9/2016 Masters .................. E06C 7/085
2019/0063073 A1 * 2/2019 Woodward ................ E06C 7/08
2019/0136620 A1 * 5/2019 Leng ........................ E06C 1/125
2019/0136625 A1 * 5/2019 Chen .......................... E06C 1/18
2024/0344392 A1 * 10/2024 Maher ........................ E06C 7/00
2025/0198236 A1 * 6/2025 Pozgay .................... E06C 7/084

* cited by examiner

*Primary Examiner* — Brian D Mattei

(74) *Attorney, Agent, or Firm* — Nathan I. North; Patterson Intellectual Property Law, PC

(57) ABSTRACT

A ladder that includes two side rails, with each side rail having a cross-sectional shape defining an at least partially enclosed channel including an outer wall. The first and second lateral walls extend inward from the outer wall, and the first lateral wall includes a first offset defining a first inner wall. Each of the lateral walls extends further inward beyond the first inner wall to define first and second connecting walls of the side rail. The ladder also includes a plurality of rungs extending between the side rails, with each of the rungs being attached to the first and second connecting walls of the side rails.

20 Claims, 7 Drawing Sheets

LADDER

FIELD OF THE DISCLOSURE

The present disclosure relates generally to ladders.

BACKGROUND

Ladders provide a simple, yet effective, means for traversing vertical distances. Ladders can be made in different types such as extension ladders, step ladders, and combinations of the two. These ladders typically include at least one ladder segment formed by two side rails connected by rungs. The different types of ladders then combine the ladder segments in different configurations. For example, an extension ladder may include two ladder segments that are slidably connected such that the two segments slide relative to each other. A step ladder may include two ladder segments (often connected at one end) that fold together or apart. And combination ladders may include two ladder segments that fold like a step ladder and also have the ability to slide relative to each other.

Ladders have been made of various materials including metals such as aluminum and fiber reinforced plastic materials such as fiber glass. Typically, aluminum ladders are lighter when providing the same strength and rigidity when compared to fiber glass ladders. A stronger ladder allows users to feel more secure as they climb the ladder, and a more rigid ladder improves operator comfort during use. Lighter ladders are easier to transport and for users to move. Non-metal ladders are desirable when working with electricity where metal ladders create a risk of electrocution.

The side rails of ladders typically have an enclosed cross section, such as a rectangle, or a partially enclosed cross section with a general C-shape. The rungs have similarly been constructed with a rectangular, circular, or C shaped cross section.

Metal ladders could connect the side rails and rungs using multiple connection types including solid rivets, blind rivets, and adhesives. Ladders made from fiber reinforced materials, on the other hand, typically cannot use rivet-type connections, commonly relying instead on adhesive connections. However, when damaged, ladders using adhesive connections are not repairable.

What is needed is a ladder made of a composite material, such as fiberglass, with strength and rigidity equivalent to or better than aluminum while also remaining lightweight. A ladder made from fiber reinforced plastic material that is repairable is also needed.

SUMMARY OF THE DISCLOSURE

One aspect of the disclosed embodiments is a ladder that includes two side rails, with each side rail having a cross-sectional shape defining an at least partially enclosed channel including an outer wall. The first and second lateral walls extend inward from the outer wall, and the first lateral wall includes a first offset defining a first inner wall. Each of the lateral walls extends further inward beyond the first inner wall to define first and second connecting walls of the side rail. The ladder also includes a plurality of rungs extending between the side rails, with each of the rungs being attached to the first and second connecting walls of the side rails.

Another aspect of the disclosed embodiments is a ladder that includes two side rails, with each side rail having a cross-sectional shape defining an at least partially boxed shape including an outer wall. The first and second lateral walls extend inward from the outer wall, and the first lateral wall includes a first offset defining a first inner wall extending substantially parallel to the outer wall, with each of the lateral walls extending further inward beyond the first inner wall to define first and second connecting walls of the side rail. The ladder also includes a plurality of rungs extending between the side rails, with each of the rungs being attached to the first and second connecting walls of the side rails. The rungs include a step surface wall, a support member spaced apart from the step surface wall, at least two transverse walls connecting the step surface wall and the support member and at least two rung connection flanges protruding below the support member.

In certain embodiments, the second lateral wall includes a second offset defining a second inner wall. Certain embodiments further configure the first and second inner walls to align with each other. In certain embodiments, the second lateral wall is free of any offset and is continuously planar including the second connecting wall. In certain embodiments, the first inner wall has a lateral width that is no more than three times a wall thickness of the first lateral wall.

In certain embodiments, the second inner wall extends laterally substantially parallel to the outer wall.

In certain embodiments, the two side rails and the associated rungs define a first ladder segment and a second ladder segment includes a further two side rails and plurality of rungs extending between the further two side rails. The second ladder segment is slidingly connected to the first ladder segment such that the first inner wall and the first connecting wall of the first ladder segment define a recess and the second ladder segment is partially received in the recess of the first ladder segment.

In certain embodiments, each rung includes a step surface wall, a support member spaced apart from the step surface wall, at least two transverse walls extending in the elongated direction connecting the step surface wall and the support member; and at least two rung connection flanges protruding below the support member. Certain embodiments further configure the connection flange to connect to the first connection wall using a solid rivet. Certain embodiments further configure the rung connection flange to connect to the first connection wall using a blind rivet. Certain embodiments further configure the rung connection flange to connect to the first connection wall using an adhesive.

In certain embodiments, the two side rails are formed from a fiber reinforced plastic material.

DETAILED DESCRIPTION

Figure 1:
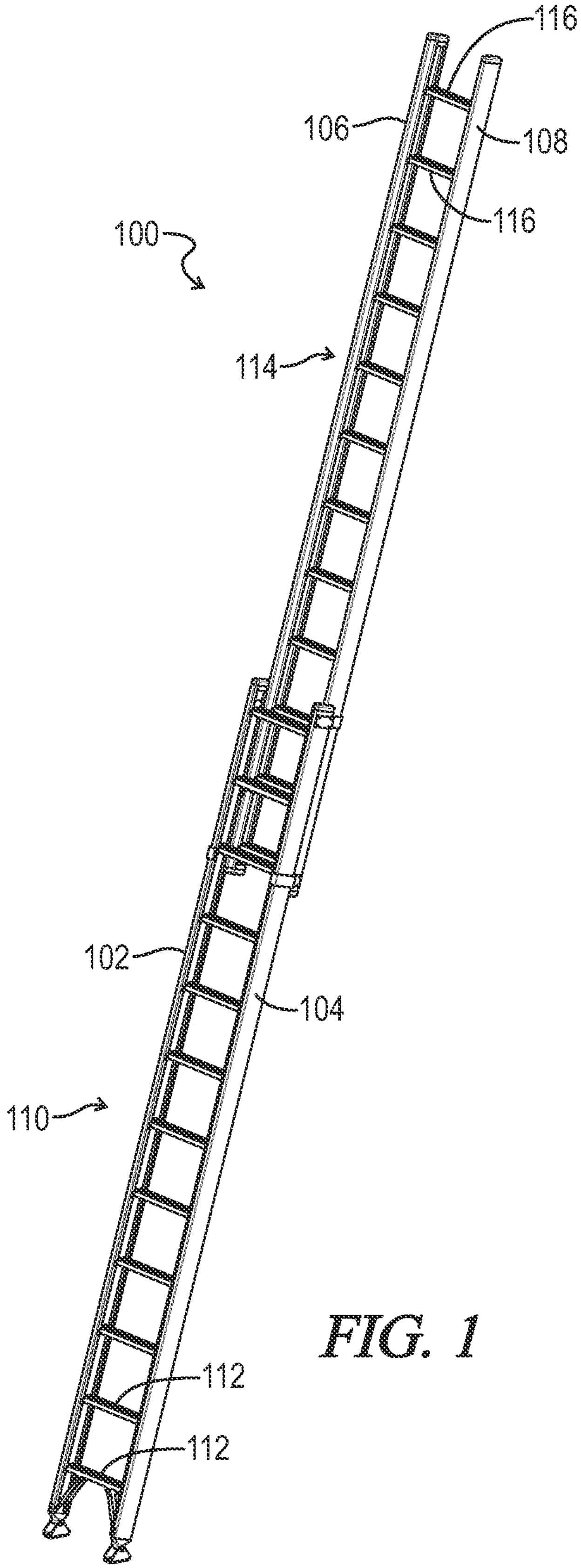
FIG. 1 illustrates a perspective view of the extension ladder assembly.

Reference will now be made in detail to embodiments of the present disclosure, one or more drawings of which are set forth herein. FIG. 1 illustrates an embodiment of a ladder configured as an extension ladder 100. The extension ladder 100 includes side rails 102, 104, 106, 108. Side rails 102, 104 form a first ladder segment 110, also known as a base segment. Side rails 102, 104 are connected by a plurality of rungs 112 extending between side rails 102, 104. Side rails 106, 108 form a second ladder segment 114, also known as a fly. Side rails 106, 108 are connected by a plurality of rungs 116 extending between side rails 106, 108. As an extension ladder, the first ladder segment 110 is configured to overlap with the second ladder segment 114 such that the first ladder segment 110 and second ladder segment 114 are slidably connected. In this embodiment, first ladder segment 110 forms the base for extension ladder 100 and second ladder segment 114 extends to permit the user to reach different heights. This functionality is accomplished through the slidable connection that allows first ladder segment 110 to slide relative to the second ladder segment 114.

Figure 2:
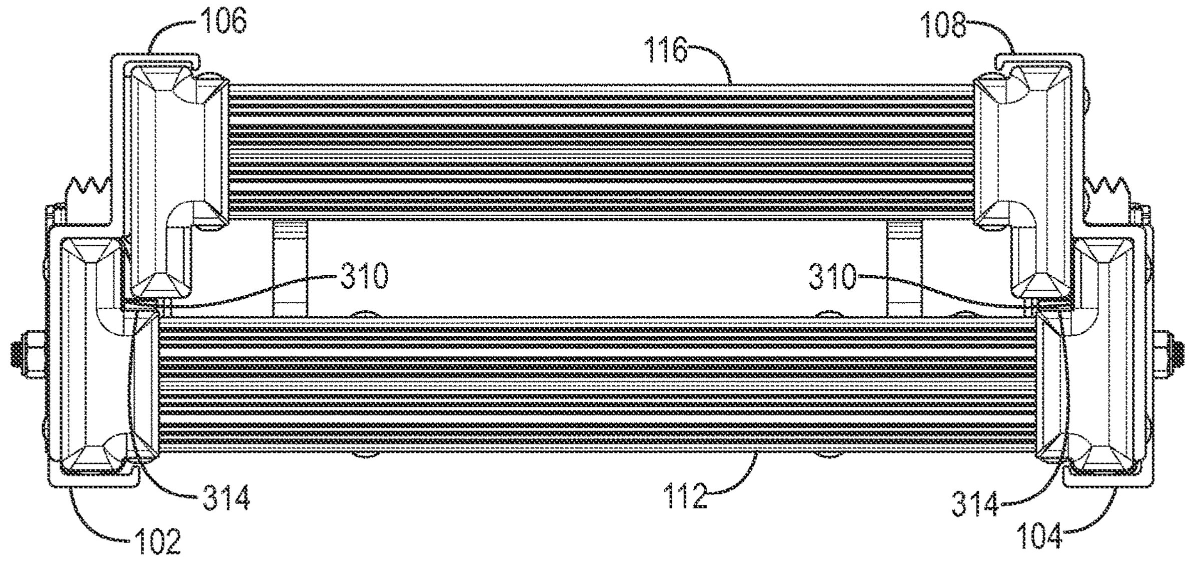
FIG. 2 illustrates a top view of the extension ladder assembly of FIG. 1.
Figure 3A:
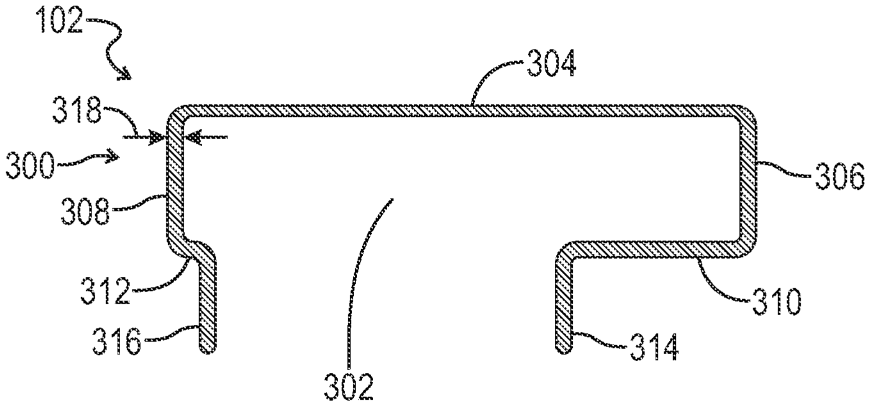
FIG. 3A illustrates a cross section view of a side rail of the extension ladder assembly FIG. 1.

FIG. 2 illustrates a top view of extension ladder 100 of FIG. 1. FIG. 3A further illustrates a cross section of side rail 102 from the perspective of FIG. 2. Side rail 102 has a cross-sectional shape 300 defining an at least partially enclosed channel 302, which may have an at least partially boxed shape. Side rail 102 includes outer wall 304, first lateral wall 306, second lateral wall 308, first inner wall 310, second inner wall 312, first connecting wall 314, and second connecting wall 316. First lateral wall 306 and second lateral wall 308 extend inward from the outer wall 302. First lateral wall 306 includes an offset that defines first inner wall 310 extending laterally. First connecting wall 314 then extends inward beyond the first inner wall 310. Second lateral wall 308 includes an offset that defines second inner wall 312 extending laterally. Second connecting wall 316 then extends inward beyond the second inner wall 312. First connecting wall 314 and second connecting wall 316 form flanges configured to connect the side rail to the plurality of rungs 112. The walls of side rail 102 together form the partially enclosed channel 302.

The embodiment illustrated in FIG. 3A shows first inner wall 310 and second inner wall 312 having different lengths, but a person of skill in the art will understand that the length of first inner wall 310 and the length of second inner wall 312 may be the same in other embodiments. The embodiment illustrated in FIG. 3A further shows second inner wall 312 with a minimal lateral width. For example, second inner wall 312 may have a lateral width that is only long enough to transition from second lateral wall 308 to second connecting wall 316. As an example, in some embodiments second inner wall 312 may have a lateral width that is shorter than three times the wall thickness 318 of side rail 102.

As illustrated in FIG. 3A, in some embodiments, first inner wall 310 and second inner wall 312 may extend laterally and substantially parallel to outer wall 304. First lateral wall 306 and second lateral wall 308 may then be substantially parallel to each other. Further, second connecting wall 316 may be substantially parallel to first connecting wall 314. First connecting wall 314 may also be substantially parallel to first lateral wall 306 and second connecting wall 316 may be substantially parallel to second lateral wall 308. First inner wall 310 and second inner wall 312 may be aligned with each other such that first inner wall 310 and second inner wall 312 are the same distance from outer wall 304. Alternatively, first inner wall 310 and second inner wall 312 may be at different distances from outer wall 304. In other embodiments, the features above may not be configured with the described parallel relationships.

Figure 3B:
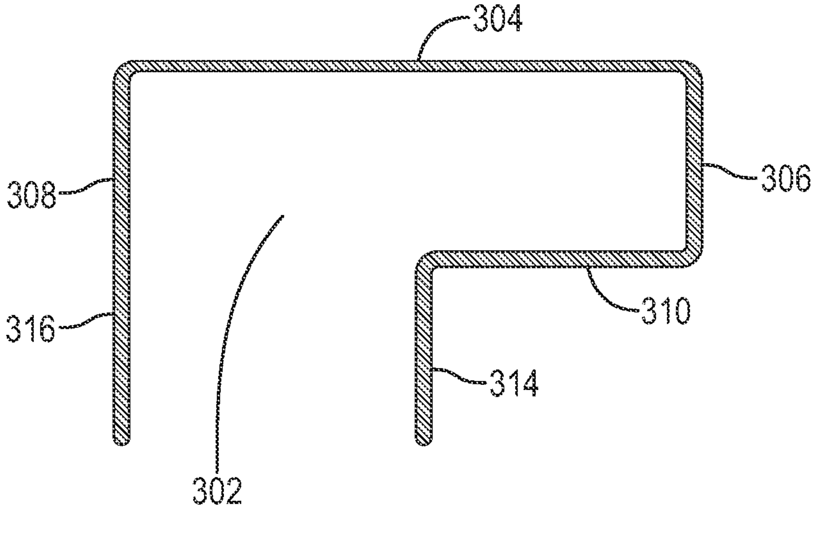
FIG. 3B illustrates a cross section view of a side rail of another embodiment of the extension ladder.

Other embodiments, as illustrated in FIG. 3B, may alternatively only include a single offset from the first inner wall 306, forming a single inner wall 310. In this embodiment, second lateral wall 308 is free of any offset and second lateral wall 308 is continuously planar to include second connecting wall 316.

In the embodiment illustrated in FIG. 1, each of side rails 102, 104, 106, 108 have the same cross section geometry illustrated in FIG. 3A. Persons of skill in the art will appreciate that in other embodiments, side rails 102, 104, 106, 108 may use different or similar cross-section geometries.

As shown in FIG. 2, side rails 102, 104 may be configured such that first inner wall 310 and first connecting wall 314 of each side rail 102, 104 forms a recess for partially receiving second ladder segment 114 by first ladder segment 110. In this way, side rail 106 may slide along the recess formed by side rail 102 and side rail 108 may slide along the recess formed by side rail 104.

Figure 4A:
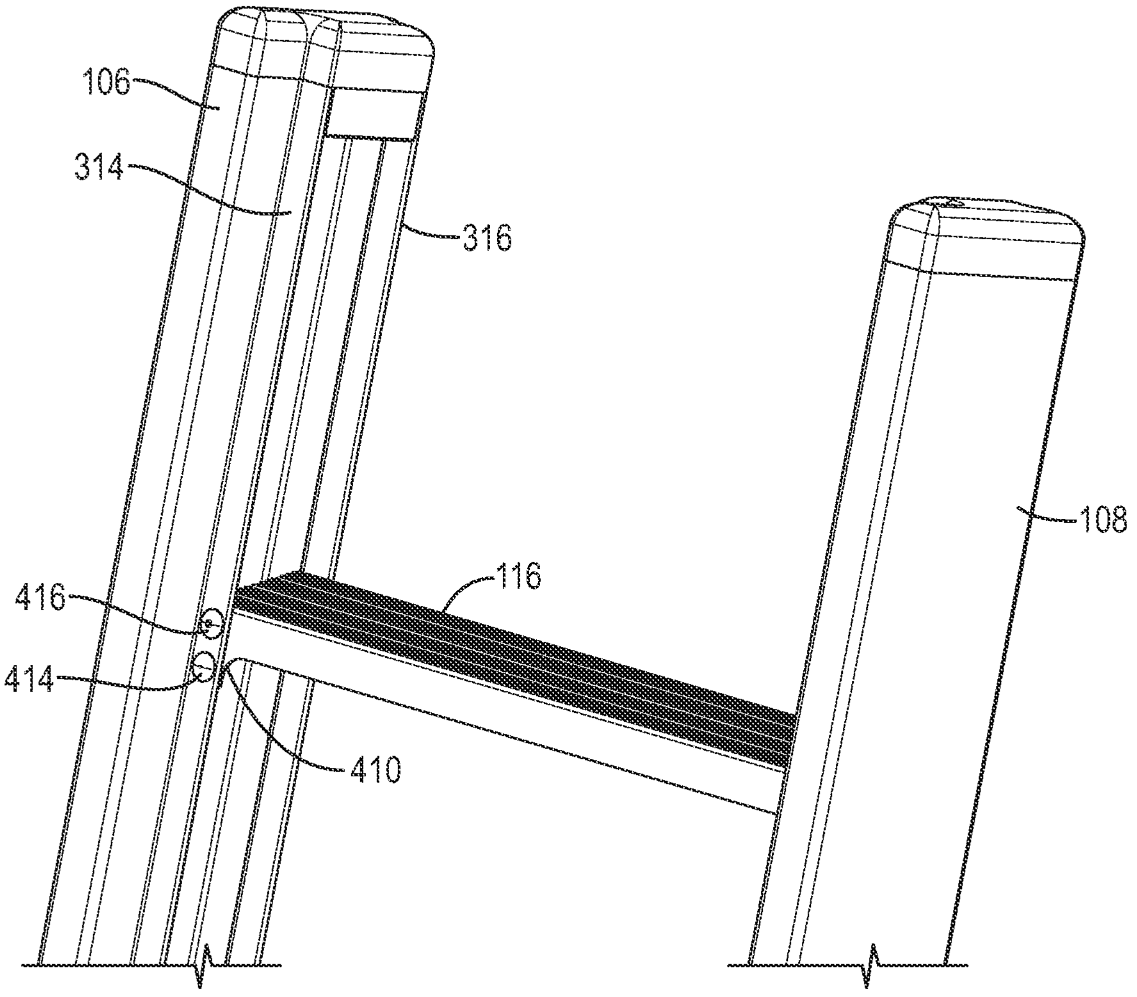
FIG. 4A illustrates a perspective view of the connection between a side rail and rung of the extension ladder assembly of FIG. 1.
Figure 4B:
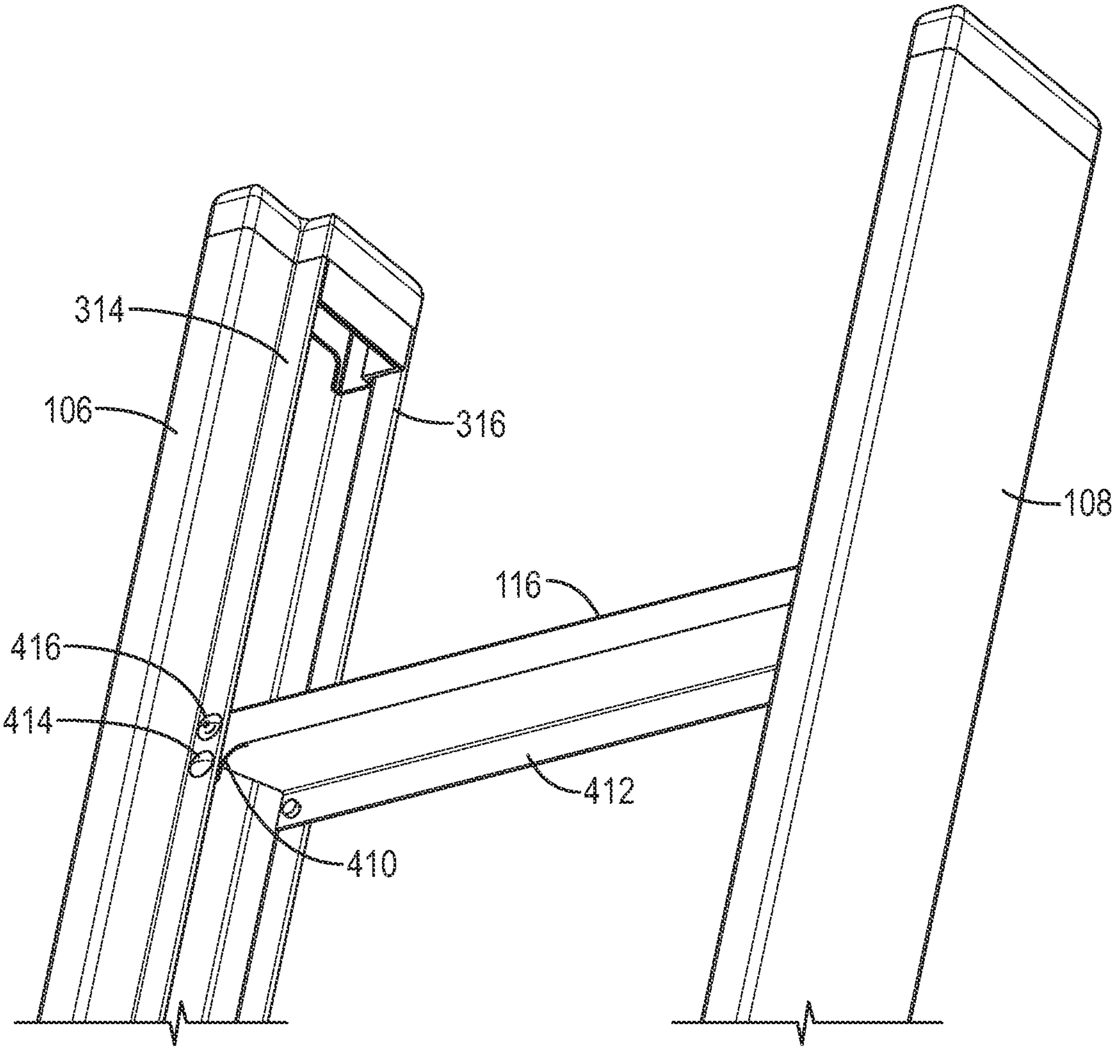
FIG. 4B illustrates a perspective view of the connection between a side rail and rung of the extension ladder assembly of FIG. 1.
Figure 4C:
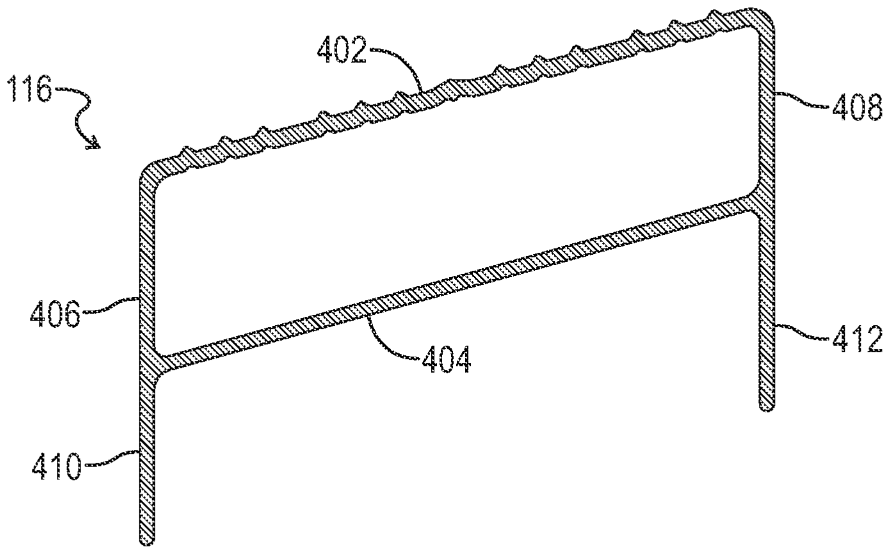
FIG. 4C illustrates a cross section view of a rung of the extension ladder assembly of FIG. 1.

As shown in FIG. 1, a plurality of rungs 112, 116 may extend between the side rails 102, 104 and side rails 106, 108, respectively, providing steps on which the user can step. As shown in FIGS. 4A, 4B, rungs 116 are attached to side rails 106, 108 at the connection walls 314, 316 of each side rail. Similarly, rungs 112 are attached to side rails 102, 104 at the connection walls 314, 316 of each side rail. FIG. 4C illustrates a cross section of one embodiment of rungs 116. Rungs 112 may have the same or a similar cross section. Rung 116 includes a step surface wall 402 and a support member 404 spaced apart from step surface wall 402. Step surface wall 402 and support member 404 are connected by two transverse walls 406, 408 that extend in the elongated direction between side rails 106, 108. Connection flanges 410, 412 protrude below support member 404 to provide connection surfaces with side rails 106, 108. As shown in FIGS. 4A, 4B, connection flange 410 may include a tab that protrudes below support member 404 and does not extend in the elongated direction. In this embodiment, rung 116 includes a tab structure connection flange 410 on both ends of rung 116 to provide connections to each side rail 106, 108. As further illustrated, connection flange 412 may be an extension of transverse wall 408 below support member 404, forming a wall that extends in the elongated direction. Alternatively, either connection flange 410 or connection flange 412 may consist of a tab, an elongated wall, or any other flange structure known in the art.

Rung connection flanges 410, 412 align with side rail connection walls 314, 316 to connect rung 116 to each side rail 106, 108. Rung connection flanges 410, 412 and side rail connection walls 314, 316 may be connected using any means known in the art. For example, FIGS. 4A, 4B illustrate an embodiment of the connection using both a solid rivet 414 and a blind rivet 416. Other connection types may include blind rivets or adhesives. Any other connection type known in the art may be used as well as any combination thereof.

In another embodiment (not shown), rungs 112, 116 may also connect to side rails having partially enclosed channels of any shape known in the art. In another embodiment (not shown), side rails 102, 104, 106, 108 may connect to rectangular rungs, C-shaped rungs, or other rungs known in the art.

Figure 5:
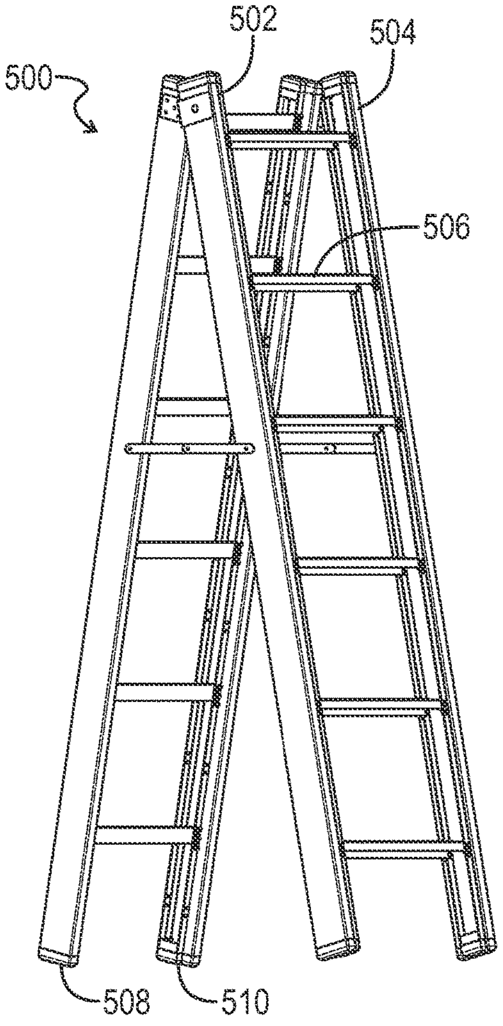
FIG. 5 illustrates a perspective view of a step ladder assembly embodiment.
Figure 6:
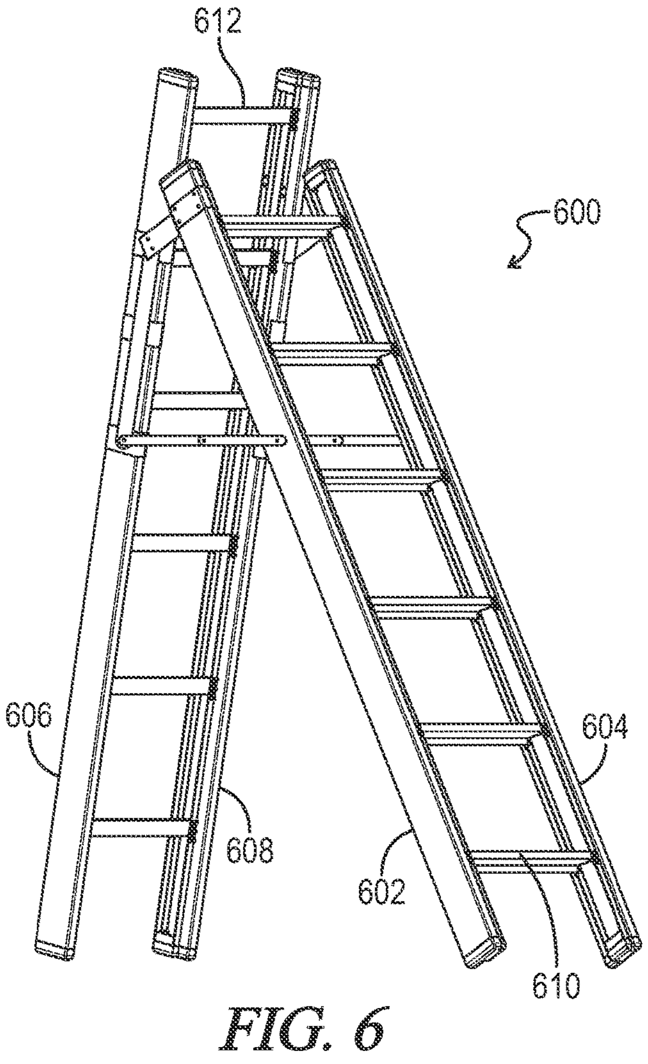
FIG. 6 illustrates a perspective view of a step extension ladder assembly embodiment.

In addition to the extension ladder 100 illustrated in FIG. 1, the disclosures discussed herein may also apply to other ladder types. For example, FIGS. 5, 6 illustrate other ladder types that utilize the side rails and rungs discussed herein. FIG. 5, illustrates a step ladder 500 that includes side rails 502, 504 according to the present disclosure. Side rails 502, 504 are connected by a plurality of rungs 506 according to the present disclosure. Side rails 508, 510 may be constructed using typical geometry for the side rails or using the side rail geometry disclosed herein. Similarly, FIG. 6, illustrates a step extension ladder 600 that also includes side rails 602, 604, 606, 608 that may be connected by a plurality of rungs 610, 612. The step extension ladder can be configured to be used as an extension ladder, a step ladder, or combination of the two. The disclosure herein may similarly be applied to other types of ladders.

The side rail and rung designs disclosed herein are configured to improve the structural strength and rigidity of the ladder. The structure of the side rails and rungs allow the side rails and rungs to be fabricated with a reduced wall thickness. The ladders discussed herein may be constructed of metals such as aluminum, fiber reinforced plastic materials such as fiber glass, or any other material known in the art. The side rails and rungs may be made from the same material or different materials.

As used throughout this specification, the words "outer," "inner," "lateral," "transverse," and other similar directional words are used with respect to the views being described.

Thus, it is seen that the apparatus and methods of the present disclosure readily achieve the ends and advantages mentioned as well as those inherent therein. While certain embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments. Therefore, the spirit and scope of the appended claims should not be limited to the description of the versions contained herein.

What is claimed is:

1. A ladder, comprising:

two side rails, each side rail having a cross-sectional shape defining an at least partially enclosed channel including an outer wall, first and second lateral walls extending inward from the outer wall, the first lateral wall including a first offset defining a first inner wall, each of the lateral walls extending further inward beyond the first inner wall to define first and second connecting walls of the side rail; and a plurality of rungs extending between the side rails, each of the rungs being attached to the first and second connecting walls of the side rails, wherein:

the two side rails and the associated rungs define a first ladder segment; and the ladder further includes a second ladder segment including a further two side rails and a further plurality of rungs extending between the further two side rails, the second ladder segment being slidingly connected to the first ladder segment;

wherein the first inner wall and the first connecting wall of the first ladder segment define a recess and the second ladder segment is partially received in the recess of the first ladder segment.

2. The ladder of claim 1, wherein:

the second lateral wall includes a second offset defining a second inner wall.

3. The ladder of claim 2, wherein:

the first and second inner walls are aligned with each other.

4. The ladder of claim 1, wherein:

the second inner wall extends laterally substantially parallel to the outer wall.

5. The ladder of claim 1, wherein:

the second lateral wall is free of any offset and is continuously planar including the second connecting wall.

6. The ladder of claim 1, wherein each rung further comprises:

a step surface wall;

a support member spaced apart from the step surface wall;

at least two transverse walls extending in an elongated direction connecting the step surface wall and the support member; and at least a first and a second connection flange protruding below the support member.

7. The ladder of claim 6, wherein the first connection flange is connected to the first connection wall using a solid rivet.

8. The ladder of claim 6, wherein the first connection flange is connected to the first connection wall using a blind rivet.

9. The ladder of claim 6, wherein the first connection flange is connected to the first connection wall using an adhesive.

10. The ladder of claim 1, wherein the two side rails are formed from a fiber reinforced plastic material.

11. The ladder of claim 1, wherein the first inner wall has a lateral width that is no more than three times a wall thickness of the first lateral wall.

12. A ladder comprising:

two side rails, each side rail having a cross-sectional shape defining an at least partially boxed shape including an outer wall, first and second lateral walls extending inward from the outer wall, the first lateral wall including a first offset defining a first inner wall extending substantially parallel to the outer wall, each of the lateral walls extending further inward beyond the first inner wall to define first and second connecting walls of the side rail;

a plurality of rungs extending between the side rails, each of the rungs being attached to the first and second connecting walls of the side rails, the rungs including:

a step surface wall;

a support member spaced apart from the step surface wall;

at least two transverse walls connecting the step surface wall and the support member; and at least a first and a second connection flanges protruding below the support member;

wherein the two side rails and the associated rungs define a first ladder segment;

wherein the ladder further includes a second ladder segment including a further two side rails and a further plurality of rungs extending between the further two side rails, the second ladder segment being slidingly connected to the first ladder segment; and wherein the first inner wall and the first connecting wall of the first ladder segment define a recess and the second ladder segment is partially received in the recess of the first ladder segment.

13. The ladder of claim 12, wherein:

the second lateral wall includes a second offset defining a second inner wall.

14. The ladder of claim 13, wherein the second inner wall extends laterally substantially parallel to the outer wall.

15. The ladder of claim 12, wherein the second lateral wall is free of any offset and is continuously planar including the second connecting wall.

16. The ladder of claim 12, wherein the first connection flange is connected to the first connection wall using a solid rivet.

17. The ladder of claim 12, wherein the first connection flange is connected to the first connection wall using a blind rivet.

18. The ladder of claim 12, wherein the two side rails are formed from a fiber reinforced plastic material.

19. The ladder of claim 12, wherein the first inner wall has a lateral width that is no more than three times a wall thickness of the first lateral wall.

20. The ladder of claim 12, wherein the first connection flange is connected to the first connection wall using an adhesive.

* * * * *